(12) United States Patent
Mueller

(10) Patent No.: US 11,808,619 B2
(45) Date of Patent: Nov. 7, 2023

(54) TIME-EFFICIENT WEIGHING IN A PRODUCTION PROCESS

(71) Applicant: Mettler-Toledo GmbH, Greifensee (CH)

(72) Inventor: Rolf Mueller, Nänikon (CH)

(73) Assignee: Mettler-Toledo GmbH, Greifensee (CH)

( * ) Notice: Subject to any disclaimer, the term of this patent is extended or adjusted under 35 U.S.C. 154(b) by 434 days.

(21) Appl. No.: 16/684,730

(22) Filed: Nov. 15, 2019

(65) Prior Publication Data

US 2020/0173840 A1 Jun. 4, 2020

(30) Foreign Application Priority Data

Nov. 29, 2018 (EP) ..................................... 18209060

(51) Int. Cl.
| | |
|---|---|
| *G01G 23/01* | (2006.01) |
| *G01G 23/37* | (2006.01) |
| *G01G 23/06* | (2006.01) |
| *G01G 19/22* | (2006.01) |
| *G01G 19/30* | (2006.01) |

(52) U.S. Cl.
CPC ............. *G01G 23/01* (2013.01); *G01G 19/22* (2013.01); *G01G 19/30* (2013.01); *G01G 23/06* (2013.01); *G01G 23/3707* (2013.01); *G01G 23/3728* (2013.01)

(58) Field of Classification Search
CPC .... G01G 23/01; G01G 23/3707; G01G 19/30; G01G 19/22; G01G 23/06; G01G 23/3728

USPC ........................................................... 73/1.13
See application file for complete search history.

(56) References Cited

U.S. PATENT DOCUMENTS

| 4,597,458 A | 7/1986 | Knothe et al. | |
|---|---|---|---|
| 4,685,525 A | 8/1987 | Knothe et al. | |
| 7,596,453 B2 | 9/2009 | Sakai | |
| 8,468,059 B2 * | 6/2013 | Enqvist ..................... | G07F 9/02 |
| | | | 705/23 |
| 2003/0094404 A1 * | 5/2003 | Kvisgaard ............ | G01G 19/303 |
| | | | 209/645 |
| 2007/0193787 A1 * | 8/2007 | Hansen .............. | G01G 23/3742 |
| | | | 177/64 |
| 2008/0046188 A1 * | 2/2008 | Savva ...................... | A61K 9/00 |
| | | | 702/22 |
| 2008/0059097 A1 | 3/2008 | Sakai | |
| 2010/0147049 A1 * | 6/2010 | Haussmann ........... | G01G 21/26 |
| | | | 73/1.13 |
| 2010/0191978 A1 * | 7/2010 | Pfau ..................... | G01G 23/017 |
| | | | 177/1 |
| 2021/0310855 A1 * | 10/2021 | Bai ........................ | G01G 19/42 |

FOREIGN PATENT DOCUMENTS

| CN | 101743459 A | * | 6/2010 | ............. | G01G 21/26 |
|---|---|---|---|---|---|
| DE | 3530170 A | * | 3/1987 | ............. | G01G 19/42 |

* cited by examiner

*Primary Examiner* — Mischita L Henson
*Assistant Examiner* — Monica S Young
(74) *Attorney, Agent, or Firm* — STANDLEY LAW GROUP LLP; Jeffrey S. Standley; Adam J. Smith

(57) ABSTRACT

A method is provided for optimizing the time required for a scale to weigh a set of ingredients. A weighing tolerance is obtained for each ingredient in the set. Based on the weighing tolerance, a readability parameter is determined for each ingredient. Based on the determined readability parameter, the scale is configured before each ingredient is weighed.

11 Claims, 1 Drawing Sheet

TIME-EFFICIENT WEIGHING IN A PRODUCTION PROCESS

CROSS-REFERENCE TO RELATED APPLICATIONS

This application claims the benefit of priority to European patent application 18209060.5, filed on 29 Nov. 2018, which is incorporated by reference as if fully recited herein.

TECHNICAL FIELD

The present invention methods and devices for optimizing the time necessary for a scale to weigh ingredients that are used in a production process. The invention aims notably at providing solutions to reduce the total time required by one scale to weigh different ingredients, while meeting accuracy requirements of the production process. Furthermore, the invention aims at warning the user if a certain ingredient weight and/or tolerance is outside of the scale capabilities, or stated otherwise if the scale isn't accurate enough to meet the needed tolerance at the given weight.

BACKGROUND ART

In a weighing scale, the readability—also known as scale interval—relates to the lowest level by which a weight can be read, and is typically expressed in grams or pounds. Therefore, the accuracy of the measurements is linked to the readability of the scale. Depending of the object or material to weigh and the requirements in terms of accuracy, it is known to adapt the readability of the scale. For instance, the patent document U.S. Pat. No. 4,597,458 A discloses a scale that allows a user to set a desired relative weighing precision, the scale adapting itself automatically. Patent document US 2008/059097A, also teaches to adapt the readability setting of a scale, according to the expected precision and observed fluctuations of the weight measurements.

Weighing of various quantity of ingredients and/or materials are part of numerous highly automated and manual industrial processes. The reduction of the weighing cycle time is then a key parameter to consider when improvements of the yield are pursued.

As a consequence, in this context, it is also to be taken into consideration that the readability has a direct influence on the duration of the stabilization period required by a weighing scale, and consequently on the measurement time. The smaller the readability the greater the measurement time.

For example, considering the industrial production of a ready meal, the production process may require to weight, at first, 10 g saffron with a tolerance of 0.1 g, and, subsequently 10 kg of rice with a tolerance of 100 g. Switching the readability of the scale manually in-between the weighing of the saffron and the rice is impractical in this context, since such an operation would not be time-efficient and error-prone.

That is why, to date, the most common solution is to set the readability of the scale to a value corresponding to the most demanding requirement considering all the weighing operations to perform during the production process. As a consequence, in the aforementioned example, the saffron and the rice would be weighed with the same readability, for instance 0.1 g to match the most demanding requirement corresponding to the weighting of the saffron.

Known solutions implying automatic switches of the readability, such as described in the patent document U.S. Pat. No. 4,685,525 A, would either be inefficient in terms of time optimization and/or would not take into consideration the accuracy and safety requirements of the production process. More particularly, switching the readability based on preset weight thresholds does not allow to take into consideration actual accuracy requirements related to specific ingredients to weigh: in order to meet accuracy requirements of the productions, it would be necessary to set the readability to the most demanding requirements of all the objects or materials meeting the corresponding preset weight threshold, that would lead to a time inefficient solution.

It is therefore still desirable to provide means for optimizing automatically time necessary for a scale to weigh a set of ingredients used in a production process, while meeting the requirements in terms of accuracy of the weight measurements for each ingredient of the set.

SUMMARY

This objective is met by the method, device and system set forth in independent claims. Details and further developed aspects are defined in the dependent claims.

To that end, according to a first aspect, the present invention concerns a method, in a production process using a set of ingredients, for optimizing time necessary for a scale to weigh said ingredients and/or components. The present invention allows reducing the total time required by one scale to weigh all the ingredients of the set, that are used in the production process.

According to the invention, the term ingredient refers to a material input of the production process, such as for example a raw material, a substance, a component, an object or a combination of the aforementioned items. For example, an ingredient can be a quantity of sugar, a mechanical piece, an electronic component, packaging, a chemical substance in a container, etc.

The term production process relates typically to the process of using various ingredients in order to make an output product, according to a known set of operations. The production process may comprise typically transformation of the ingredients by mechanical and/or chemical steps to create the output product. The production process can be, for example, a process related to the production of a food product, a consumer goods, an industrial mechanical assembly, etc.

Typically, the production process follows a precise plan to describe in detail the operations to perform, using known or determinable quantity for each ingredient.

For example, a production process may require the blending of four ingredients, the weight of two of them having to be determined during the process. It may be necessary for example to gather a known quantity of a first ingredient extracted from a larger batch, and to check that the actual weight of a second ingredient corresponds to the expected weight.

The method according to the invention comprises a step of obtaining a weighing tolerance, for each ingredient of the set. The weighing tolerance for a given ingredient of the set relates to the permissible limits of variation in the measurement of the weight for said given ingredient to be performed by the scale. Typically, the weighing tolerance may be expressed as a percentage or an absolute value in kilograms, grams or pounds. For example, for a weighing tolerance of 1%, the actual measurement of the scale when weighing a 100 g object should be comprised between 99 g and 101 g. Typically, the smaller the weighing tolerance the greater the time necessary for the scale to obtain a stable measurement.

The method according to the invention further comprises a step of determining, for each ingredient of the set, a readability parameter of the scale according to the weighing tolerance, for each ingredient of the set.

The readability parameter relates to the lowest level by which a weight can be read, and is typically expressed in grams. If the scale's capacity is 1000 g, and that the readability parameter is equal to 0.1 g, then the scale can propose a reading of a weight according to 1000/0.1=10 000 divisions. Typically, the lower the weighting tolerance the lower the readability parameter.

The method according to the invention further comprises a step wherein, for each ingredient of the set, and before weighting said ingredient, the scale is configured according to the readability parameter.

As a consequence, according to the invention, it is possible to configure the scale so as that its readability parameter is specifically set for each ingredient of the set, according to the requirements of the production process. By retrieving the weighing tolerance associated to each ingredient to weigh, the readability parameter can be adapted to each ingredient.

By contrast to known solutions, it is no longer necessary to set the readability parameter according to the most demanding requirement considering all the ingredients to weigh. For example, if a first and a second ingredient requires respectively to set the readability to 0.1 g and 10 g, it is possible according to the invention to configure the readability parameter of the scale to 0.1 g before weighing the first ingredient, and then to 10 g before weighing the second ingredient. The invention provides an anticipation mode wherein the readability parameter of a scale is set dynamically and automatically, before weighing each ingredient. The readability parameter is not a fix setting anymore.

Typically, the maximal time required for the method according to the invention to switch the readability parameter to a new one is inferior to sensibly 1 second.

Without the contribution of the invention, it would have been necessary, to meet the requirement of the production process, to set the readability parameter of the scale to 0.1 g for the first and the second ingredient, leading to a waste of time when weighing the second ingredient. Alternatively, without the contribution of the invention, it would have been necessary for an operator to change the readability parameter manually, which is impractical due to the required time to switch the readability parameter via the scale user interface and error-prone.

In an embodiment, the method further comprising the following steps:
for each ingredient of the set, obtaining an expected weight of said ingredient to measure;
for each ingredient of the set, determining a tare parameter of the scale according to said expected weight;
for each ingredient of the set, before weighing said ingredient, the scale is additionally configured according to the tare parameter.

Taring process being usually performed manually by an operator, in this embodiment, the invention allows automating this process and consequently further improving weighing speed. It removes the need for an operator to configure manually the scale when a taring process is required, for example when a new container is used to weigh an ingredient.

In an embodiment, the set of ingredients is ordered so as that the position in the set corresponds to the order wherein each ingredient is weighed. For example, the first ingredient to be weighed is positioned in first position of the set, the second ingredient to be weighed is positioned in second position of the set, etc. Consequently, after having weighed one ingredient of the set, the scale is automatically configured according to the readability parameter corresponding to the following ingredient of the set.

In another embodiment, before weighing one ingredient of the set, the ingredient is identified and the corresponding readability parameter is obtained. The scale is then automatically configured according to the readability parameter of the identified ingredient. The ingredient can be identified using notably one or a combination of the means described in the following non-exhaustive list: an optical identification module such as a barcode reader or a camera provided with an optical recognition module, a radio frequency identification module such as an RFID tag, a mechanical identification module, etc.

The weighing tolerance, the readability parameter, an identification label or any information related to the currently weighed ingredient can be displayed, for example to the operator. It allows providing to the operator information about the current setting of the scale, and thus improving reliability of the production process and awareness of the operator.

According to an embodiment, the readability parameter is determined according to the weighting tolerance and a safety factor. The use of the safety factor allows taking into consideration uncertainties and meeting safety requirements for critical production processes and/or regulatory purposes.

For example, if the next ingredient to weigh correspond to 100 g of saffron with a tolerance of 1%, the readability parameter can be determined by multiplying 100 g with the tolerance of 1%, and then divided the result by the safety factor, for example 2. In this example, the readability parameter will be set to 0.5 g.

In particular, the readability parameter may be determined by:
determining an optimal readability parameter according to the weighting tolerance and a safety factor;
obtaining a readability set of available readability values for the scale;
if the optimal readability parameter is smaller than the highest available readability values of the readability set, setting the readability parameter to the highest available readability value of the readability set that is inferior or equal to the optimal readability parameter;
if the optimal readability parameter is greater than or equal to the highest available readability values of the readability set, setting the readability parameter to the highest available readability values of the set.

For example, if the next ingredient to weigh correspond to 100 g of saffron with a tolerance of 3%, the optimal readability parameter can be determined by multiplying 100 g with the tolerance of 3%, and then divided the result by the safety factor, for example 2. In this example, the optimal readability parameter will be 1.5 g. The readability set of available readability values for the scale comprises for example 0.5 g, 1 g, 2 g, 5 g, 10 g. The highest available readability values of the readability set being equal in this example to 10 g, the optimal readability parameter is smaller than the highest available readability values of the readability set. The readability parameter will be set to the highest available readability value of the readability set that is smaller than or equal to the optimal readability parameter, that is to say in this example 1 g.

According to another example, if the next ingredient to weigh correspond to 10 kg of rice with a tolerance of 1%, the optimal readability parameter can be determined by multiplying 10 000 with the tolerance of 1%, and then divided the result by the safety factor, for example 2. In this example, the optimal readability parameter will be 50 g. The readability set of available readability values for the scale comprises for example 0.5 g, 1 g, 2 g, 5 g, 10 g. The highest available readability values of the readability set being equal in this example to 10 g, the optimal readability parameter is greater than the highest available readability values of the readability set. The readability parameter will be set to the highest available readability value of the readability set that is inferior or equal to the optimal readability parameter, that is to say in this example 10 g.

It is then possible to adapt the method to the particular capabilities and feature set of the scale, by taking into consideration only readability values that are effectively available in the scale. In particular, by choosing the highest available readability values of the set if the optimal readability parameter is superior or equal to the highest available readability values of the readability set, only values available on the scale are determined. Moreover, by taking into consideration the safety factor and also choosing the highest available readability value of the readability set that is inferior or equal to the optimal readability parameter, it allows to provide reliable and secure method to choose the readability parameter, meeting the requirement of the production process, while still improving the cycle time required to weigh all the ingredients of the set.

In an advantageous embodiment, if the readability parameter is smaller than or equal to the smallest available readability value of the readability set, an error message indicating that the scale is not accurate enough to weigh said ingredient is generated. This feature allows identifying situations where the scale may not be accurate enough to perform the corresponding weighing task, and informing the operator and/or coupled systems appropriately.

For example, if the next ingredient to weigh correspond to 100 g of saffron with a tolerance of 1%, the optimal readability parameter can be determined by multiplying 100 g with the tolerance of 1%, and then divided the result by the safety factor, for example 2. In this example, the optimal readability parameter will be 0.5 g. If the readability set of available readability values for the scale comprises for example 0.5 g, 1 g, 2 g, 5 g, 10 g, the readability parameter is equal to the smallest available readability value of the readability set. As a consequence, the accuracy and the reliability of the scale may not be sufficient to perform the corresponding weighing task.

According to a second aspect, the invention also relates to a management module, in a production process using a set of ingredients, for optimizing time necessary for a scale to weigh said ingredients and/or components. The management module is notably adapted to implement the method according to the first aspect. The management module is configured, for each ingredient of the set, to:
  obtain a weighing tolerance;
  determine a readability parameter of the scale according to the weighting tolerance;
  before weighing said ingredient, configure the scale according to the readability parameter.

The management module may be configured to determine the readability parameter according to the weighting tolerance and a safety factor. The management module can be configured to determine the readability parameter by:
  determining an optimal readability parameter according to the weighting tolerance and a safety factor;
  obtaining a readability set of available readability values for the scale;
  if the optimal readability parameter is smaller than the highest available readability values of the readability set, setting the readability parameter to the highest available readability value of the readability set that is inferior or equal to the optimal readability parameter;
  if the optimal readability parameter is greater than or equal to the highest available readability values of the readability set, setting the readability parameter to the highest available readability values of the set.

The management module may also be configured, if the readability parameter is smaller than or equal to the smallest available readability value of the readability set, to generate an error message indicating that the scale is not accurate enough to weigh said ingredient. The management module may be configured, for each ingredient of the set, to:
  obtain an expected weight of said ingredient to measure;
  determine a tare parameter of the scale according to said expected weight.

The management module is then arranged, for each ingredient of the set, before weighing said ingredient, to additionally configure the scale according to the tare parameter.

According to a third aspect, the invention also relates to a system comprising a management module according to the second aspect and a scale.

The system may further comprise a terminal comprising a display adapted to present information related to the production process, and/or a user interface adapted to allow notably an operator to enter, consult and/or modify information related to the production process. It allows providing to the operator information about the current setting of the scale and on the current production process, and thus improving reliability of the production process and awareness of the operator. The information related to the production process may relate to the set of ingredients used in the production process, and in particular a name for each ingredient, a weight for each ingredient, a weighing tolerance for each ingredients, an order according to which the ingredients of the set should be weighed, etc.

Advantageously, the scale may be configured to a default readability parameter and/or default tare parameter, before being configured by the management module according to the readability parameter and/or tare parameter. As a consequence if the readability parameter and/or the tare parameter is not available before weighing an ingredient, default values may be used. It allows improving the overall reliability and availability of the system, providing a fall-back position in adverse conditions.

According to a fourth aspect, the present invention also relates to a computer program that can be downloaded from a communication network and/or stored on a medium. This computer program comprises instructions for causing implementation of the method according to the first aspect, when said program is run by the processor.

According to a fifth aspect, the present invention also relates to information storage means, storing a computer program comprising a set of instructions causing implementation of the method according to the first aspect, when the stored information is read from said information storage means and run by a processor.

BRIEF DESCRIPTION OF DRAWINGS

In the following, the invention will be explained in more detail through examples and references to the attached drawings, wherein.

DETAILED DESCRIPTION

Figure 1:
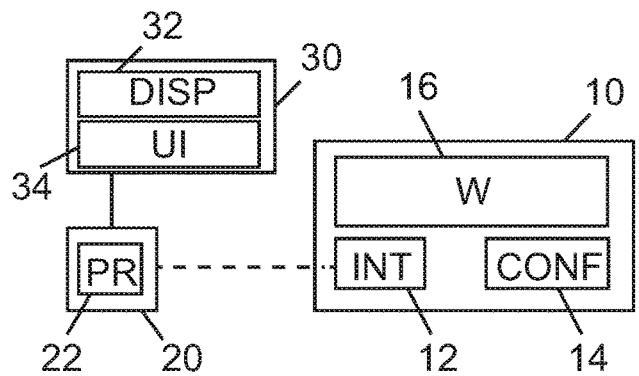
FIG. 1 illustrates a weighing system that can be used to carry out the method of the present invention.

FIG. 1 schematically illustrates a weighting system that can be used to carry out the method of the present invention. The weighting system comprises a scale 10, a management module 20 and a terminal 30. In the exemplary embodiment represented on FIG. 1, the scale 10, the management module 20 and the terminal 30 are shown as separated modules. Different arrangements can be considered, depending on integration constraints into the production environment, as for instance the physical distance between the weighing area and the operator. In particular, the management module 20 and/or the terminal 30 may be integrated in one device embed into the scale 10. Conversely, the management module 20 and/or the terminal 30 may be remotely positioned relatively the scale 10.

The scale 10 comprises an interface 12 adapted to couple the scale to the management module 20 in order to allow the reception of configuration messages sent by the management module 20 to the scale 10. The scale 10 further comprises a configuration module 14 and a weighing module 16 adapted to weigh ingredients. The configuration module 14 is adapted to control the scale module so as to adapt configurable features of the weighing module 16, such as a tare setting and a readability parameter. Moreover the configuration module is adapted to interpret the configuration messages sent by the management module 20 to the scale 10, and configure the corresponding configurable features of the weighing module 16 accordingly. For instance, the configuration module 14 may receive configuration messages comprising information describing a tare setting and/or a readability parameter, and process said message to adapt the corresponding configurable features of the weighing module 16. The configuration module 14 may also be configured to use a default readability parameter and/or a default tare parameter, until at least one configuration message comprising an instruction related to the next ingredient that will be weighted by the scale 10 for the readability parameter and/or the tare parameter is received from the management module 20.

The terminal 30 comprises a display 32 and a user interface 34. The display 32 may be used in particular to present information related to the scale 10, and more particularly configurable features of the weighing module 16, such as a tare setting and a readability parameter. The display 32 may comprise one or a plurality of screens. The display 32 may also be used to present information related to the production process, in particular related to the set of ingredients used in the production process, and in particular a name for each ingredient, a weight for each ingredient, a weighing tolerance for each ingredient, an order according to which the ingredients of the set should be weighed, etc. The terminal 30 also comprises a user interface 34, adapted to allow notably an operator to enter information and/or navigate into available information and/or adapt the presentation of the available information. The user interface 34 may be used enter and/or navigate into information related to the production process, in particular related to the set of ingredients used in the production process, and in particular a name for each ingredient, a weight for each ingredient, a weighing tolerance for each ingredient, an order according to which the ingredients of the set should be weighed, etc. The management module 20 may include (not represented in FIG. 1) a communication interface 18 adapted to allow remote transmissions of information to the scale 10 and/or the management module 20 through a communication network.

The management module 20 comprises a processing module 22, for example a module provided with at least one Central Processing Unit and a Random-Access Memory. The management module 20 may further comprises storage means 16, for example a Hard-Drive and/or a solid-state memory, for storing data and allowing the processing module 22 to read and/or write said data. The management module 20 may include (not represented in FIG. 1) a communication interface 18 adapted to allow remote transmissions of information to the scale 10 and/or the terminal 30 through a communication network.

Figure 2:
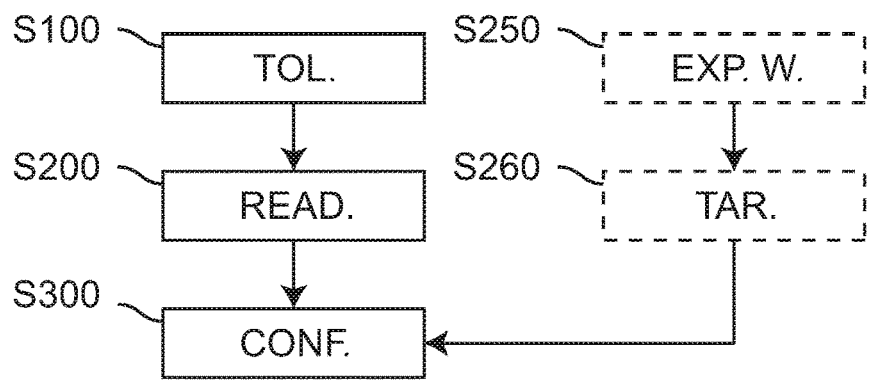
FIG. 2 represents a flowchart of the method according to the invention.
Figure 3:
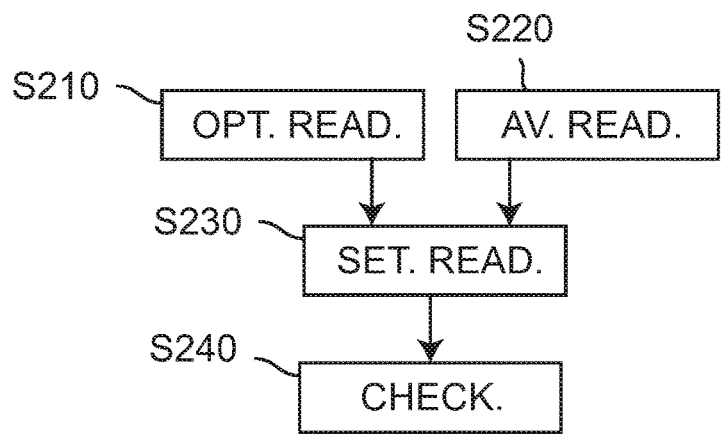
FIG. 3 represents a flowchart of the sub-step of the step S300 according to one embodiment of the method according to the invention.

Any and all steps of the method described hereafter with regard to FIGS. 2 and 3, may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

FIG. 3 delineates the method of the invention in the form of a flowchart. The management module 20 is adapted to implement the steps of the method according to the invention.

In a step S100, for each ingredient of the set, a weighing tolerance is obtained. The management module 20 may either obtain the weighing tolerance for the corresponding ingredient from a local memory, or from the terminal 30. The weighing tolerances for all the ingredients of the set are known information defined according to the production process.

In a step S200, for each ingredient of the set, a readability parameter of the scale is determined according to the weighing tolerance, obtained in the step S100. During the step S200, the readability parameter may be determined according to the weighting tolerance and a safety factor.

In an embodiment, as illustrated in FIG. 3, the readability parameter is determined by:

in a sub-step S210, determining an optimal readability parameter according to the weighting tolerance and a safety factor;
 in a sub-step S220, obtaining a readability set of available readability values for the scale; and
 in a sub-step S230,
  if the optimal readability parameter is smaller than the highest available readability values of the readability set, setting the readability parameter to the highest available readability value of the readability set that is inferior or equal to the optimal readability parameter; and
  if the optimal readability parameter is greater than or equal to the highest available readability values of the readability set, setting the readability parameter to the highest available readability values of the set.

In this embodiment, in an optional sub-step S240, if the readability parameter is smaller than or equal to the smallest available readability value of the readability set, to generate an error message indicating that the scale is not accurate enough to weigh said ingredient. The error message can be sent to the terminal 30 to be presented to the operator, and/or to other coupled systems (not represented in the figures).

In this embodiment, the method may further comprise the following optional sub-steps. In an optional sub-step S250, for each ingredient of the set, an expected weight is obtained. The management module 20 may either obtain the expected weight for the corresponding ingredient from a local memory, or from the terminal 30. The expected weight for each ingredient of the set is known information defined according to the production process. In an optional sub-step S260, for each ingredient of the set, a tare parameter of the scale is determined according to said expected weight obtained in the sub-step S250.

In a step S300, before weighing the corresponding ingredient, the scale is configured according to the corresponding readability parameter, and optionally according to the tare parameter determined during the optional sub-step S260. The management module 20 may in particular send a message to the configuration module 14 containing an instruction to set the readability parameter of the scale 10 to the readability parameter determined during the step S200. The management module 20 may also send a message to the configuration module 14 containing an instruction to set the tare setting of the scale 10 to the tare parameter determined during the optional sub-step S260.

It should be noted that the step S100, the step S200 and the step S300, and their respective optional sub-steps, are all performed before the start of the actual weighing operation of the corresponding ingredient.

What is claimed is:

1. A method for optimizing the time required for a scale to weigh each ingredient in a set of said ingredients in a production process, comprising using a processor configured to perform the steps of:
   obtaining an expected weight of the ingredient and a weighing tolerance for each ingredient;
   determining a readability parameter scale setting, which defines a weighing accuracy for a minimum weight out of a set of readability parameters, of the scale for each ingredient, where the determination is based upon calculations performed on the obtained expected weight and the weighing tolerance, wherein the readability parameter relates to a lowest level by which a weight can be read by the scale, wherein the readability parameter is determined by the steps of:
      determining an optimal readability parameter according to the obtained expected weight of the ingredient, the weighing tolerance of the ingredient and a safety factor that is a reduction multiplier to bias borderline weight values into increased accuracy settings, wherein the optimal readability parameter is defined as the product of multiplying the expected weight of the ingredient, the weighing tolerance and a reciprocal of the safety factor;
   and then:
      if the optimal readability parameter is smaller than a highest available readability value of the readability set, then setting the readability parameter to the highest available readability value of the readability set that is less than or equal to the optimal readability parameter; or
      if the optimal readability parameter is greater than or equal to the highest available readability value of the readability set, then setting the readability parameter to the highest available readability value of the readability set; and
   using a configuration module in the processor to configure the scale to the determined readability parameter setting for the ingredient before weighing the ingredient.

2. The method of claim 1, further comprising the substep of:
   generating an error message, indicating that the scale is not accurate enough to weigh said ingredient, if the optimal readability parameter is less than or equal to the smallest available readability value of the readability set.

3. The method of claim 1, further comprising the steps of:
   for each ingredient of the set, obtaining the expected weight of the ingredient;
   determining a tare parameter of the scale based on the expected weight; and
   additionally configuring the scale, based on the tare parameter, before weighing the ingredient.

4. A program for implementation on a computer, comprising instructions for causing implementation of the method according to claim 1, when said program is run by a processor associated with the scale.

5. A management module of a processor for managing the time necessary for a scale, in a production process, to weigh a set of ingredients and/or components, wherein the management module is configured, to perform for each ingredient of the set the following:
   obtain an expected weight value for the ingredient and a weighing tolerance for the ingredient;
   determine, for the scale, a readability parameter according to the weighing tolerance, wherein the readability parameter is a scale setting that defines a weighing accuracy for a minimum weight out of a set of readability parameters, wherein determining the readability parameter scale setting involves using at least the following steps:
      determining an optimal readability parameter based on the weighting tolerance of the expected ingredient weight and a reduction by a safety factor that is a reduction multiplier to bias borderline weight value into increased accuracy settings;
      obtaining a readability set of available readability values for the scale; and
      if the optimal readability parameter is less than the highest available readability values of the readability set, setting the readability parameter to the highest available readability value of the readability set that is less than or equal to the optimal readability parameter; and
   if the optimal readability parameter is greater than or equal to the highest available readability values of the readability set, setting the readability parameter to the highest available readability values of the set; and
   using the management module to configure the scale according to the determined readability parameter setting for the ingredient before weighing the ingredient.

6. The management module of claim 5, wherein the management module is configured to generate an error message indicating that the scale is not accurate enough to weigh the ingredient, if the readability parameter is less than or equal to the smallest available readability value of the readability set.

7. The management module of claim 6, wherein the management module is configured, for each ingredient of the set, to do the following:
   obtain an expected weight of the ingredient to be measured;
   determine a tare parameter of the scale based on the expected weight; and additionally configure the scale based on the tare parameter for each ingredient of the set, before weighing said ingredient.

8. A weighing system, incorporated into a production process, defined by a plan for weighing ingredients, the weighing system comprising:
   a weighing scale having a weighing module;
   a configuration module adapted to automatically change the interval of the scale measuring accuracy to a setting of a readability parameter from a set of readability parameters;
   an interface; and
   a terminal, where the terminal comprises:
      a display adapted to present information related to the production process;
      a user interface adapted to allow an operator to enter, consult and/or modify information related to the production process; and
   a management module, coupled to the terminal and the interface, and further comprising a processing module configured, according to the predetermined order, the following steps:
      obtain, for the ingredient to be weighed, an expected weight for the ingredient and a weighing tolerance, from a local memory or from the user interface;
      determine a readability parameter for the weighing scale according to the weighing tolerance, wherein the readability parameter relates to a lowest level by which a weight can be read by the scale, where the readability parameter value is dimensioned in units of minimum weight, where determining the setting of the scale's readability parameter value from the set of readable parameter sets involving using at least the steps of determining an optimal readability parameter based on the weighting tolerance and a reduction by a safety factor that is a reduction multiplier to bias borderline weight values into increased accuracy settings and selecting a readability parameter setting from a readability set of available readability values for the scale; such that:
         if the optimal readability parameter is less than the highest available readability values of the readability set, setting the readability parameter to the highest available readability value of the readability set that is less than or equal to the optimal readability parameter; and
         if the optimal readability parameter is greater than or equal to the highest available readability values of the readability set, setting the readability parameter to the highest available readability values of the set; and
      where the configuration module automatically configures the weighing scale to the determined readability parameter setting of the ingredient before weighing the ingredient.

9. The weighing system of claim 8, wherein:
   the weighing scale is configured to a default readability parameter before being configured by the management module according to the readability parameter.

10. The weighing system claim 8, wherein the processing module is further configured to generate an error message indicating that the scale is not accurate enough to weigh the ingredient, if the readability parameter is less than or equal to the smallest available readability value of the readability set.

11. The weighing system of claim 8, wherein the processing module, in the step of configuring the weighing scale according to the readability parameter before weighing the ingredient, does the following:
   obtains an expected weight of the ingredient to be measured;
   determines a tare parameter of the weighing scale based on the expected weight; and
   additionally configures the weighing scale based on the tare parameter for each ingredient of the set.

* * * * *

UNITED STATES PATENT AND TRADEMARK OFFICE
CERTIFICATE OF CORRECTION

| | | |
|---|---|---|
| PATENT NO. | : 11,808,619 B2 | Page 1 of 1 |
| APPLICATION NO. | : 16/684730 | |
| DATED | : November 7, 2023 | |
| INVENTOR(S) | : Mueller | |

It is certified that error appears in the above-identified patent and that said Letters Patent is hereby corrected as shown below:

In the Claims

In Column 11, Line 15, Claim 8, please insert -- and -- after "process;".

Signed and Sealed this
Fifth Day of March, 2024

Katherine Kelly Vidal
*Director of the United States Patent and Trademark Office*